(12) United States Patent
Gabay et al.

(10) Patent No.: US 6,402,522 B1
(45) Date of Patent: Jun. 11, 2002

(54) WORKBOOK WITH MOVABLE COLORED TABS

(76) Inventors: Eleonora Gabay; Natan Kogan, both of 1412 Stone Ridge Cir., Helmetta, NJ (US) 08828

( * ) Notice: Subject to any disclaimer, the term of this patent is extended or adjusted under 35 U.S.C. 154(b) by 0 days.

(21) Appl. No.: 09/686,431

(22) Filed: Oct. 11, 2000

Related U.S. Application Data

(60) Provisional application No. 60/160,752, filed on Oct. 21, 1999.

(51) Int. Cl.[7] .............................. G09B 3/00; G09B 7/00
(52) U.S. Cl. ...................... 434/322; 434/353; 434/354
(58) Field of Search ................................. 434/170, 322, 434/327, 334, 345, 346, 347, 348, 363, 364, 354, 353, 309, 311

(56) References Cited

U.S. PATENT DOCUMENTS

| | | | | |
|---|---|---|---|---|
| 2,193,048 A | * | 3/1940 | Velde | |
| 3,154,863 A | | 11/1964 | La Prelle | .......................... 35/9 |
| 3,304,627 A | | 2/1967 | Cella | ............................... 35/8 |
| 3,505,746 A | * | 4/1970 | Jackson | |
| 4,031,636 A | | 6/1977 | Hurt | ........................... 35/48 A |
| 4,493,654 A | | 1/1985 | Stuart | .......................... 434/347 |
| 4,728,294 A | * | 3/1988 | Bredehorn | ................... 434/327 |
| 4,781,598 A | * | 11/1988 | Cutler | ........................ 434/327 |
| 5,183,399 A | | 2/1993 | Muller | ........................ 434/322 |
| 5,639,240 A | * | 6/1997 | Werzberger | ................... 434/88 |
| 6,056,549 A | * | 5/2000 | Fletcher | ...................... 434/112 |
| 6,101,367 A | * | 8/2000 | Luciano | ....................... 434/308 |

OTHER PUBLICATIONS

Math 1, Gregorich, School Zone Publishing C., 1994 pp. 13 and 31.
Basic Phonics, Frank Shaffer Publications, Inc., 1995 pp. Long Vowels: A i(13); Pull–Out Answers (B).
Third Grade in Review, Kennedy, Instructional Fair, Inc., 1993, pp. 44 and Answer Key for p. 44.
Brighter Child Series, Math, Grade 1, Gerber, American Education Publishing,1992, pp 21 and Answer Key for p 21.
ETA Primary Grades Catalog, Math, Science, Social Studies, and Language Arts, 1996, p. 22.
The Journal of Special Education, vol. 2, No. 2, 1968 The Role of Color in Learning and Instruction, Otto et al, pp 155–165, n.b. pi 156).

* cited by examiner

*Primary Examiner*—Jacob K. Ackun, Jr.
*Assistant Examiner*—Bena B. Miller

(57) ABSTRACT

An educational device having a hand-held booklet containing a series of problems with color-coded selectable answers and flat answer card having movable colored tabs and compatible to the booklet. The answer card is typically enclosed in the booklet and can serve as a bookmark. Children record their answers by placing the selected colored tabs into the corresponding positions on the answer card. Children check their own work by comparing site-by-site the colors of the tabs on their answer card with the colors on the corresponding answer key. No pencil is used, answer keys are easily readable, and exercises can be repeated many times since there is no trace of earlier responses. Additionally, students' answer cards and answer key card may be stacked together and create for the teacher a color display of class or group understanding.

3 Claims, 4 Drawing Sheets

Correct answer

Incorrect answer

WORKBOOK WITH MOVABLE COLORED TABS

CROSS-REFERENCE TO RELATED APPLICATIONS

This application claims the benefit of U.S. Provisional Application No. 60/160,752 filed Oct. 21, 1999.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING APPENDIX

Not Applicable

BACKGROUND OF THE INVENTION

The present invention relates generally to educational devices, more particularly to book-like educational devices such as workbooks, which permit children, especially young children, children with learning problems, and children with limited proficiency in the language of instruction to practice in a wide range of learning skills in mathematics, language, science, social study, musical grammar, etc. in a way that promotes a sense of self-confidence and joy.

Workbooks are well known in the educational field. A wide variety of workbooks have been developed to aid in teaching children arithmetic, grammar, languages, history, and other standard essentials in school curricula. Such workbooks are valuable instructional tools because they cover a wide range of learning skills, because they provide the diversity of formats, and because exercises are typically sequenced from easiest to most difficult so that children can learn more easily and their progress can more readily monitored.

However, the conventional workbooks, which employ the pencil as a traditional recording tool, have important limitations. The following will explain this statement in detail:

a) Some children, especially children with learning problems, make many errors while they work. Such children erase frequently, causing their papers to become messy. When their papers are messy, children do not have a feeling of satisfaction because they do not receive a clear picture of their accomplishments. As a result, children try to avoid practicing learning skills.

b) All children, especially children with low level of self-confidence, want to check and correct their own work by themselves because they would like to display to parents, teachers, and others only their work that is 100 percent correct. However, the checking mechanisms of many workbooks, while possibly appropriate for adult supervisors, discourage children from checking their work by themselves because the format of the answer keys is intimidating. Such checking mechanisms are too busy and require a comparison of a student's answers with drawn or written answers on answer-key pages, which are often presented in a reduced, two-dimensional, busy format. The literature exhibits checking mechanisms of this type in Kennedy, *Third Grade in Review*, Grand Rapids, MI Instructional Fair, Inc., 1993, pp.44 and corresponding answer key; Brighter Child Series, *Math, 1 Grade*, American Education Publishing, 1992, pp.21 and corresponding answer key; Gregorich, *Math, 1 Grade*, School Zone Publishing Company, 1994, pp. 13 and corresponding answered key; and Homework Helpers, *Basic Phonics, Grade 2*, Frank Schaffer Publications, Inc., 1995, pp13 and corresponding answer key. These formats repeat the exercises themselves with pluralities of pictures and additionally contain either matching lines, or circles, or shades, or colors. Children with poor discrimination skills are especially unable to apprehend distantly differences between their answers and the answers provided on such keys. There is essentially only one way to receive feedback—words from a supervisor: "You are right!" If a child makes mistakes, he/she generally tries to quickly erase them. But unfortunately, many traces of incorrect answers remain on the paper.

c) Although exercises in the conventional workbooks are generally enriched by fun drawings and interesting formats, many children find them boring. Young children, children with LD (learning disabilities) and ADD (attention deficit disorder) are reality-oriented learners. They succeed in concentrating, performing, and learning when the task allows them to be immersed in the task physically as well as mentally. They rather prefer to do something (sort, place, match, insert, and so on) than write.

d) Children with short memory need to repeat exercises many times in order to acquire a particular skill. However, exercises in conventional workbooks that use a pencil can be used only once.

e) Teachers spend a great deal of time checking children's written answers. This procedure is too time consuming, especially for large class instruction. As a result the teacher is not able to have sufficient time to provide guidance and prompts to students with low independence, such the students with limited proficiency in the language of instruction or students with learning problems.

Therefore, a long-standing need has existed to provide children, especially young children, children with learning difficulties, and children with limited proficiency in the language of instruction with alternative workbooks which increase children's self-confidence giving them opportunity to be successful in practicing learning skills and be rewarded for good job. These workbooks should provide manipulative activity and have easily readable one-dimensional answer keys, to allow children to correct their work by themselves without traces of incorrect answers, and to permit them to repeat exercises again and again. Also a long-standing need has existed to provide a teacher with an instructional tool, which saves time giving the opportunity to rapidly, at a glance check students Works.

Various attempts have been made to create educational devices that eliminate writing, incorporate manipulative activity, provide children with opportunities for self-checking and self-correcting, and provide teachers with the opportunity to immediately assess class or group understanding, but none of these is completely satisfactory for all above-stated purposes.

For example, U.S. Pat. No. 4,493,654 to Stuart involves using of a piece of string to record answers to exercises. To check their work, children compare their placement of the string with a drawing showing its correct placement. This answering checking method is potentially confusing to children with learning difficulties. If there is an incorrect response, it is quite difficult to tell which response is wrong. Additionally, the technique with string requires an identical format of exercises on each page. This feature is restrictive for workbooks, which cover a wide range of learning skills and use the diversity of formats.

Another device on the school market is exemplified by the VERSA-TILES® system described, for example in the brochure ETA® Primary Grades Catalog, produced and published by Educational Teaching Aids. 1996, pp.22–29. This system offers systematically arranged exercises that are answered using manipulative activities involving the placement of tiles into a specially made frame. To answer the multiple problems in an exercise, children select tiles and place them in the frame. To check their work, they compare the picture they have created with the tiles with the picture in the answer key, which is given in very reduced form. The method of checking answers is difficult because it involves two-dimensional complicated figures presented on two different scales. An additional difficulty for children with learning problems is that they have to compare these figures at a distance. Moreover, children are unable to determine initially what particular question was wrong. Furthermore, this device does not provide answers in a conventional form in addition to the graphical form.

U.S. Pat. No. 4,781,598 to Cutler describes a booklet and a separate decoder that functions as an answer key. To answer an exercise, a child selects one of three responses, each of which corresponds to a shape (circle, square, and triangle). Using this device, children check their answers by comparing the shape they selected with the shape for the answer on corresponding item on the decoder. This device has three especially serious deficiencies: 1) It contains mechanical parts, such as wheels rotated about an axle, which reduce the reliability and duration of the system; 2) It does not provide answers in a conventional form in addition to the graphical form; and 3) Comparing two geometrical figures is sometimes difficult for children with poor recognition skills. Such children find it much easier to compare primary colors than to compare shapes.

Numerous studies have been done to establish form/color preferences in matching tasks. Exemplary of these studies is Otto and Askov, *The role of Color in Learning and Instruction*, J. Spec. Educ. 2,ppl155–167, 1968. which finds that matching on the basis of color is considered to be a the more primitive response and matching on the basis of form is the more highly developed one.

The answering system used in U.S. Pat. No. 5,183,399 to Muller does incorporate color, but this product is not suitable as a workbook because it requires the use of colored clamps and because the exercises are printed on a rigid material that cannot be stacked or banded. Like the immediately previous devices, this device does not provide answers in a traditional form. Additionally, the technique with clamps requires the strict position of answer keys relative to the position of the corresponding questions rendering it unsuitable for modification, such as in workbook format.

Color is used in U.S. Pat. No. 3,154,863 to La Prelle for self-checking as well. The student preselects the color indicating a correct answer, then chooses the corresponding answer card that has a hole with fixed location, and covers the exercise card with the answer card. When the correct answer has been selected, the color showing through the hole will be the same as that of the preselected color. This device is not suitable for creating workbooks because of the burdensome number of answer cards. Additionally, the process of self-checking is difficult for children with poor memory because they must keep in mind the preselected color.

Color is used in U.S. Pat. No. 3,304,627 to Cella for indicating to an instructor at a glance the answers to multiple-choice questions, which have been selected by the various students in a class. The invention provides an indicator having a rotating panel, which is set by the student to a position corresponding to the selected answer. The opposite face of the panel, which is visible to the instructor, contains readily recognizable designations, which can be seen from the instructor's location. These designations may comprise differently colored areas one of which is visible in each position of the panel. This device is not a workbook, and may be compatible only with multiple-choice exercises.

U.S. Pat. No. 4,031,636 to Ryckman et al also is intended to save teacher's time on checking procedure and create the picture of class understanding as a whole. It describes a card grading device, in which the Answer Card bears at least one lengthwise column of true-false/multiple-choice answer space having lines thereon for marking to indicate answers to a plurality of questions. It is to be folded along its length and stacked together so that the top rim edges of the answer spaces create a visible mark thereon. This visible mark may be compared with the key mark to indicate correct answers. This device allows teacher to stack cards together and see whole picture of students' answers. However, this technique uses a positional registering of the answers, not using color, and needs extra space. For example, for a 4 choices answer it is necessary to use 4 cells inside the linear space for one question. In contrast for positional registration with color coding each question needs only one cell. The card of the patent may be used only one time, because the children and teacher mark their responses by pen and pencil. It is not effective to use with workbooks, because it is necessary to have a plurality of cards for each page of exercises. Besides, this device cannot successfully used by young children and children with learning problems, because it requires filling out small cells, which can be easily confused.

Although the prior art devices may be generally satisfactory for their intended purposes, they are not satisfactory for a workbook for young children, for children with learning problems, and for children with limited proficiency in the language of instruction. It is apparent that there is a need for an alternative workbook for these children that incorporates manipulative activity for recording answers on a separate flat member which is compatible with a book format, provides a readable non-distant one-dimensional answer key using color as the best informational signal, provides additionally a written question-answer form on the answer key for better skills reinforcement, and gives children the opportunity to correct their work without traces of mistakes. It is also apparent that there is a need for a workbook that allows teacher to check children works at a glance and receive the objective, visual and comprehensive picture of class or group understanding.

BRIEF SUMMARY OF THE INVENTION

The present invention is a "hands-on", self-checkable, self-corrective, extremely simple, reusable workbook for children, especially for young children, children with learning problems, and children with limited proficiency in the language of instruction. It instructs children in a wide range of academic skills using exercises that are grouped by topic and that are progressively sequenced from easiest to more difficult. It gives to the teacher a time-saving tool for assessing student, group, and class understanding.

The workbook has two principal parts:
  a booklet containing the exercises with answer keys and
  an answer card with punched holes and colored movable flexible tabs inserted into the holes. As a result, the present invention has several objectives and advantages:
Because the pencil is a great source of frustration for LD and ADD students, one objective of the invention is to provide an educational device, more particularly, an alternative workbook for such children which permits them to record their answers by a means other than that of using a pencil.

It is another object of the invention is to provide an educational device that permits children to record their answers in a way that uses color since color is the most immediately recognizable signal for checking answers.

It is another object of the invention is to provide an educational device that permits children to record their answers on the separate flat answer card, which is compatible with a book format and is enclosed essentially as a bookmark. This feature allows keeping the usual format of a workbook and provides convenience in operating and storing.

It is another object of the invention is to provide an educational device that permits children to record their answers by operating with colored tabs. This activity fully involves children in learning, concentrates their attention and makes learning entertaining and fun.

It is another object of the invention is to provide an educational device that gives children a clear, well-organized and extremely easy way to record and check answers. This is achieved by using color-coded selectable answers, a linear (one-dimensional) arrangement of colored tabs on the separate answer card, and by using well-structured color-coded answer key. This permits children to check the particular problem just by comparing side-by-side (not at a distance) the color on the answer card with the color on the answer key. Practically, the color-coded answer key works as a color stencil. The coincidence of colors is rewarding for children and they receive a great feeling of success, which is very important for them.

It is yet another object of the invention to provide an educational device, which permits children to correct their work by themselves and without traces of mistakes. This is achieved by the simple procedure of changing the incorrect colored tab for correct one.

It is another object of the invention is to provide a time-saving educational device which permits teachers at-a-glance to identify student and class understanding. Stacking together the students' answer cards and using an answer key card in front of a stack as a guide achieve this goal.

Further objects and advantages of the invention are to provide an educational device, which is economical and simple to produce, highly effective in use, easy to understand and operate by children, and reusable indefinitely will be apparent from the description herein.

In accordance with certain of its aspects, this invention relates to a book-like educational device for teaching children, especially young children, children with learning problems and children with limited proficiency in the language of instruction to practice a particular subject, comprising:

a booklet having a plurality of exercise pages and a finite number of exercise pages and an answer key page for each exercise page; each of said exercise pages including at least one problem and a plurality of selectable color-coded answers for each problem; said answer key page including a colored linear pattern consisting of a number of colored symbols corresponding to the number of problems on said exercise page, such that the color of each symbol match the color of the correct answer on the exercise page; and a separate flat answer card insertable into said booklet, said answer card comprising: (a) a punched card having vertically positioned pairs of holes arranged near the top edge of said punched card such that the intervals from one pair of holes to the adjacent pair of holes correspond to the intervals from one colored symbol to the adjacent colored symbol on said linear colored pattern on said answer key page; each of said pairs of holes being numbered successively; and (b) colored plastic flexible tabs inserted to said pairs of holes of said punched card in a manner such that the upper prong of each tab is partially visible above the top edge of the card; said tabs having the same colors as the proposed answers on the exercise page; whereby upon completion of the particular problem from the exercise page a tab of the color of the selected answer is inserted into the pair of holes on said punched card corresponding to the particular problem and correct and incorrect answers can be determined by aligning said colored linear pattern on said answer key page with the top edge of said answer card during checking the correctness of the answers.

BRIEF DESCRIPTION OF THE DRAWINGS

The present invention may best be understood with reference to the following description, taken in connection with the accompanying drawings.

DETAILED DESCRIPTION OF THE INVENTION

Figure 1:
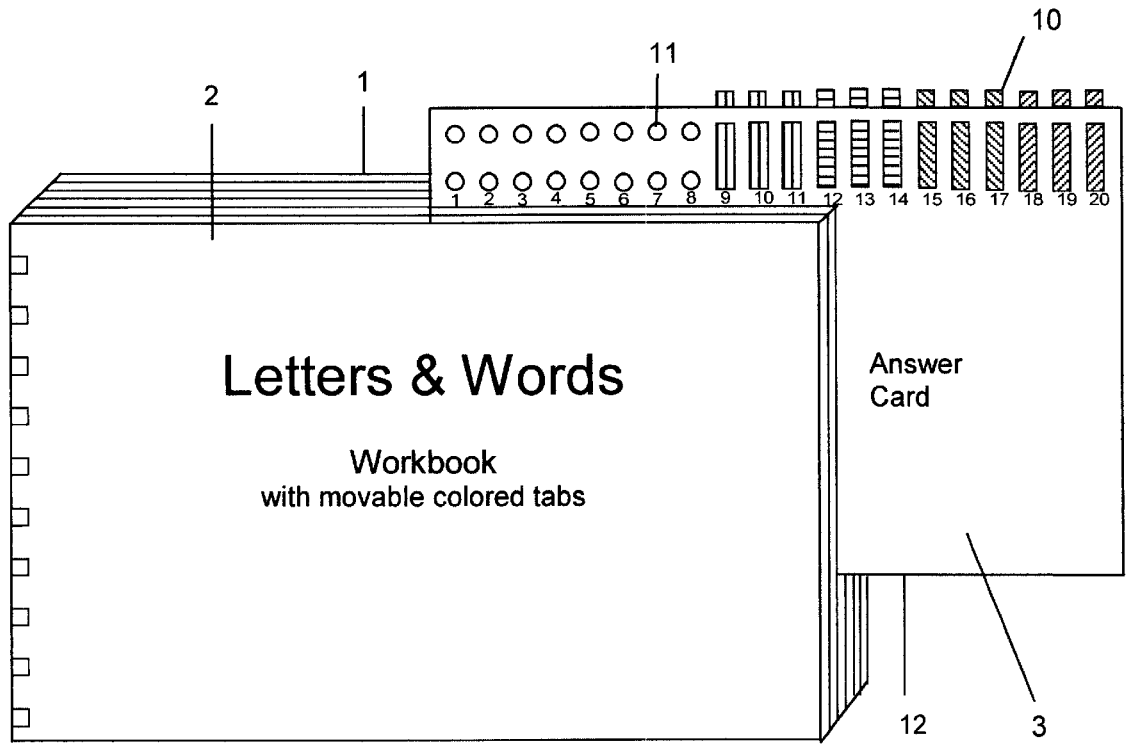
FIG. 1 is a reduced front elevation view of the booklet in a closed position and with the answer card inserted between pages.

Referring to FIG. 1, the workbook with movable colored tabs 1, meaning the product as a whole, contains a booklet 2, which is illustrated in a closed position. The booklet 2 has bound pages that can be turned and made to lie flat, and an answer card 3 that can be enclosed in the book and can serve as a bookmark.

Figure 2:
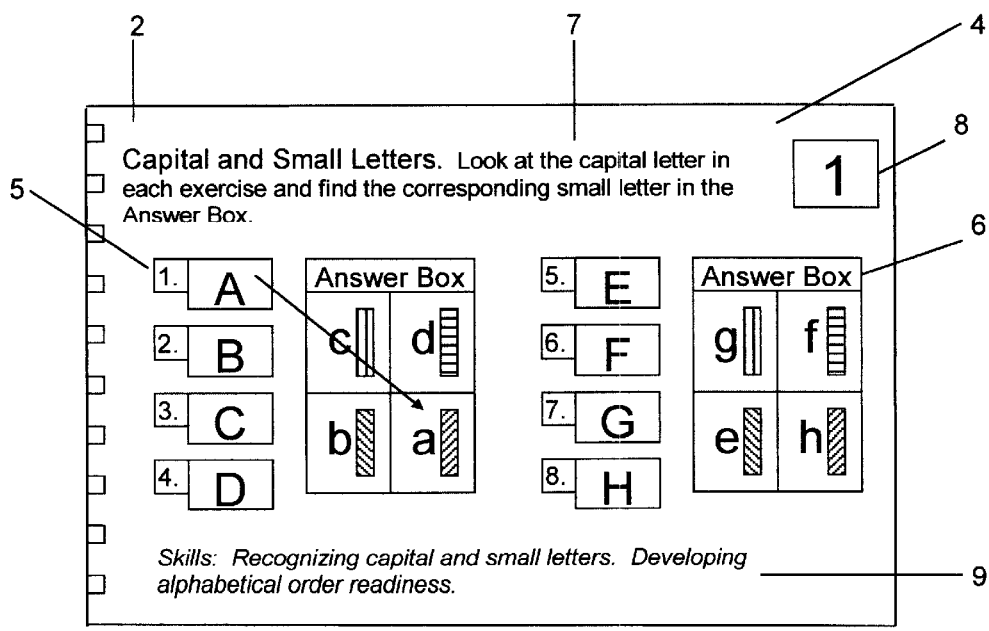
FIG. 2 is a front elevation view of a typical exercise page.
Figure 3:
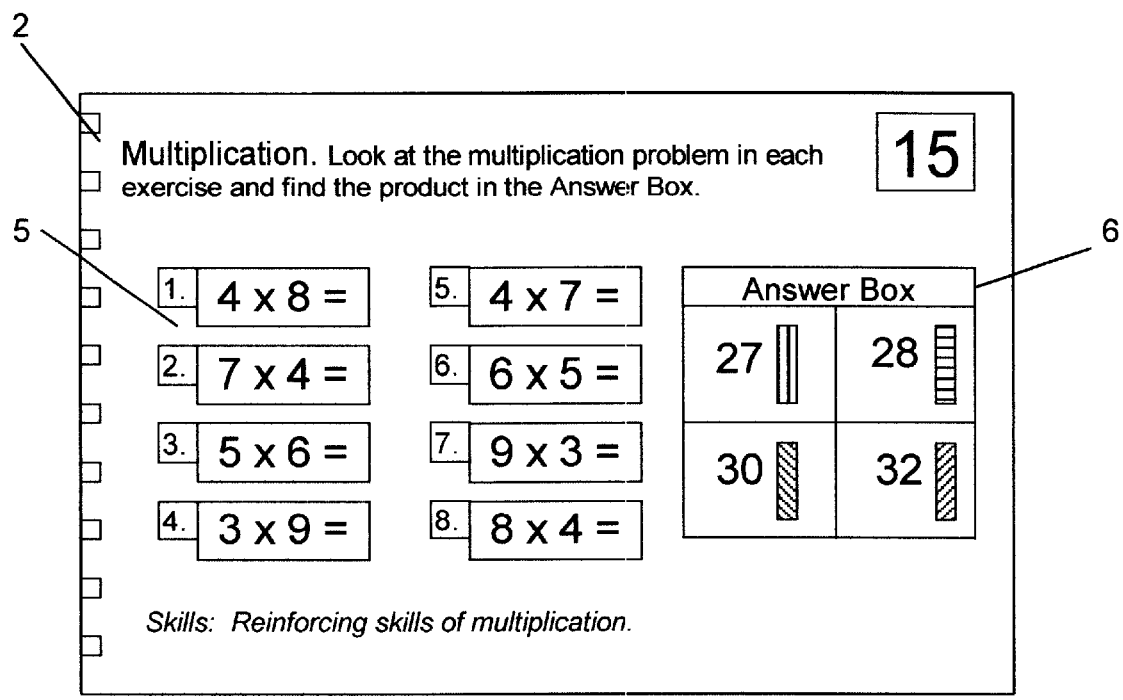
FIG. 3 is a front elevation view of a typical alternative exercise page.
Figure 4:
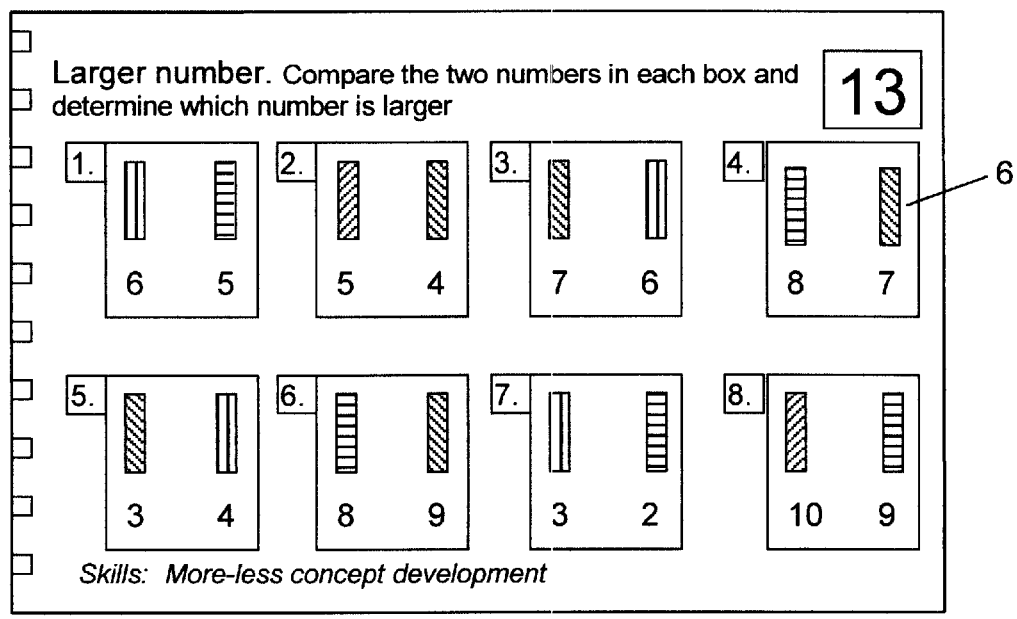
FIG. 4 is a front elevation view of another typical alternative exercise page.

Referring to FIG. 2, the booklet 2 contains a number of exercise pages one of which is illustrated as 4. Each of these pages 4 contains a section 5 with at least one but preferably multiple problems, a section 6 with color-coded selectable answers, a section 7 providing directions, and a section 8 indicating page number. The particular skills developed by the exercise page are identified in a line 9 at the bottom of the page. Referring to FIG. 2, the matching format of exercises offers four color-coded selectable answers to four problems. The colors indicated by hatching in the figure are used for coding of answers and typically are red, yellow, green, and blue. These four colors may be employed in different formats. FIGS. 2, 3, and 4 show possible formats of exercises using these four colors. Modifications may be prepared with more than four colors associated with answers, for instance in addition to the four colors mentioned, orange, black, purple and pink. Four colors are preferred for teaching children with learning problems. For children with limited the number of colors could be increased without causing undue confusion.

In FIG. 2 and in the other figures color codes are illustrated as follows: red is represented by vertical lines, yellow is represented by horizontal lines, green is represented by diagonal lines, and blue is represented by diagonal lines of opposite orientation.

Referring again to FIG. 1, the answer card 3 has colored flexible plastic tabs 10 that are inserted into vertically positioned pairs of holes 11. The holes 11 are vertically arranged in two parallel rows along the top edge of the answer card so that tab 10 can be easily inserted into a pair of the holes. This particular card 3 has 20 pairs of holes. The twelve pairs of holes on the right side are intended for storing the tabs when they are not being used and the eight pairs of holes on the left side are intended for answering the problems on each page.

Figure 5:
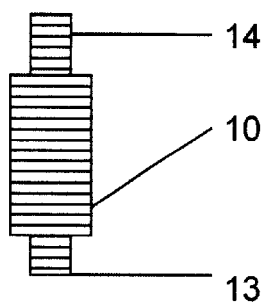
FIG. 5 is a front elevation view of the tab in enlarged form.

Referring to FIG. 5, each colored tab 10 is oblong and has both a short prong 13 and a longer prong 14. This tab 10 is designed so that the short prong is inserted into the lower hole and the longer prong is inserted into the upper hole of the two holes in a pair, in such a way that one prong is partially visible above the upper edge of the answer card.

Figure 6:
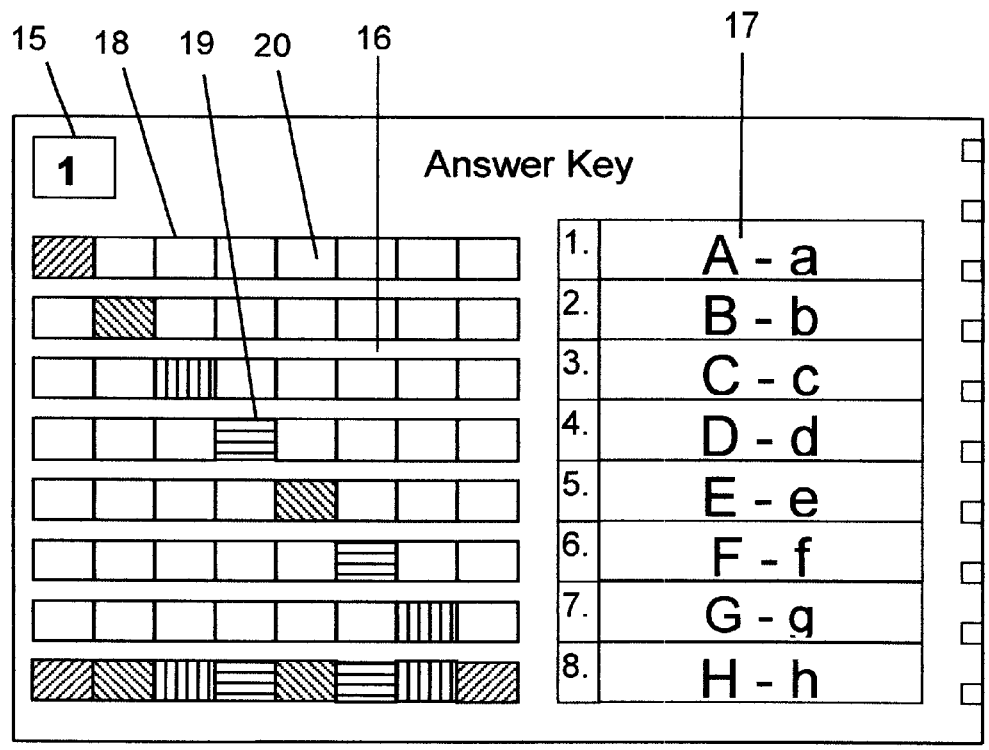
FIG. 6 is a front elevation view of a color-coded answer key.

Referring to FIG. 6, the booklet contains a number of answer key pages 15, typically on the back of the exercise page, each of which has two sections. On the left there is an answer key presented in a color-coded form 16, and on the right there is an answer key in written form 17 for verification and reinforcement skills. The color-coded answer key 16 takes the form of bands 18 all but the lowermost of which consist of one colored 19 and the remaining uncolored 20 rectangles. The first band from the top has a single colored rectangle, and this rectangle is illustrated as the first from the left. The second band from the top also has a single colored rectangle, but in this case, the rectangle is the second position from the left, and so on. In the last band from the top all the rectangles are colored.

Figure 7:
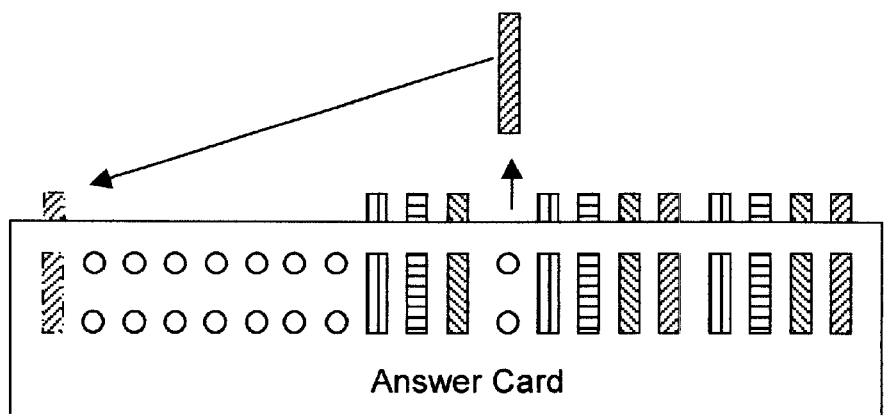
FIG. 7 is a front elevation view illustrating inserting a colored tab into the pair of holes on the answer card for the answer to a first problem.

Referring to FIG. 2 and to FIG. 7, the answer recording technique has the following steps. The student works out each problem, selects an appropriate tab, and inserts it in the proper position. For example, problem 1 requires the student to recognize the small letter corresponding to the capital letter "A." The student looks at the small letter "a" in the Answer Box, chooses the appropriate tab (in this case blue), takes a blue tab off the answer card, and inserts a blue tab into the first position on the answer card. The student then answers the rest of the exercises on the page in the same manner.

Figure 8:
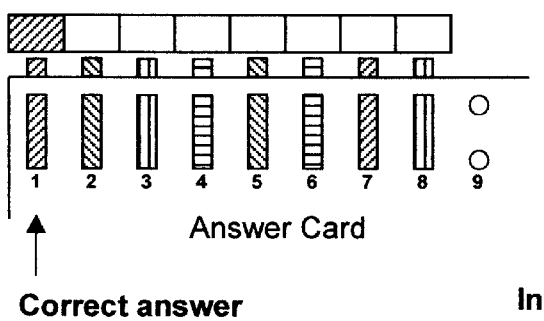
FIG. 8 is a partial front elevational view of the answer card resting against the color-coded answer key showing a correct answer to the first problem.
Figure 9:
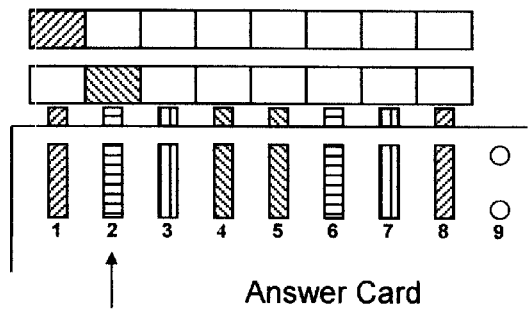
FIG. 9 is a partial front elevation view of the answer card resting against the color-coded answer key showing an incorrect answer to the second problem.

Referring to FIG. 8 and FIG. 9, the answer-checking and correcting technique has the following steps. When the student has completed all the problems on a page, he or she should turn over the page and put the answer card over the answer key bands. In FIG. 8, the first band reports the correct response to the first problem on a page. This band is laid out on the page so that it is aligned with the first band of the written answer section on the right, and so on. So, the student compares the first response to the color of the top band. If the colors are the same, the answer is correct. If the colors are different (FIG. 9) the student takes off the wrong tab, turns the page back and looks at the problem again on the exercise page to find the correct answer and puts the right tab into corresponding position. For better memorizing he/she can refer to the question-answer form on the right side of this page.

Sliding the answer card down, the student checks the responses band by band. In the last band all the rectangles are colored; thereby allowing children to check not only the answer to the last problem but also to observe the exercise as a whole. The lesson is completed when all the tabs match the colors of the bands. When children see that all their answers are correct, they feel a great sense of accomplishment that reinforces the desire to learn and increases their self-confidence. Before the student begins the exercises on the next page, he/she should place tabs on the right side of the answer card to start again.

Figure 10:
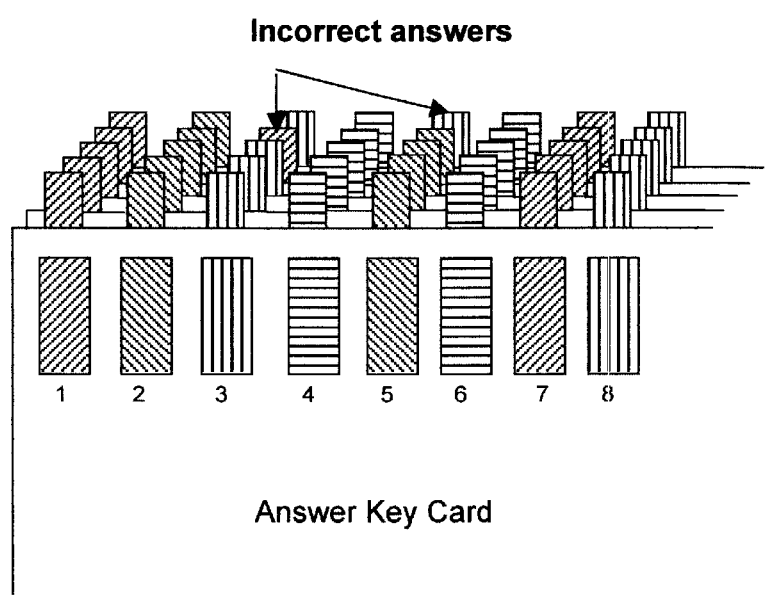
FIG. 10 is a partial front elevational view of a stack of answer cards highlighting incorrect answers to the problems on an exercise page.

As illustrated in FIG. 10, in the classroom the teacher may use these workbooks for time-saving procedure for at a glance evaluating group or class understanding. Before the students start to check and correct the exercise, the teacher can combine all answer cards of a group of students and stack together with answer key card containing all the correct answers. These cards create a comprehensive colored display of class or group understanding. Thus, an aspect of the invention is a method for evaluating group or class understanding which comprises combining into a stack a plurality of students' answer cards containing at least one colored tab inserted in a pair of holes of a punched card, so that the color of said tab corresponds to the color of a selected answer to a particular problem on the exercise page of a booklet in a manner such that the upper prong of said tab is partially visible above the top edge of the card, placing an answer key card as a front card having said tab of the color of the correct answer, so as, when viewed from above, the top display presents a colored comprehensive picture permitting a teacher to visually evaluate class or group understanding on the basis of the number of incorrect answers.

It is apparent to those skilled in the art that the workbook described can be further adapted within the scope of the invention.

What is claimed is:

1. A workbook with movable colored tabs for teaching children, comprising:

a booklet containing a plurality of pages each having a front surface and a back surface, said front surface displaying exercises comprising a number of problems and a number of selectable color-coded answers, said back surface displaying an answer key comprising a colored linear pattern of a number of colored symbols corresponding to said number of problems on said front surface, each of said colored symbols representing the color of a correct answer to one of each of said number of problems, and a separate flat answer card comprising:

a card having a plurality of pairs of holes, each of said pairs of holes having vertically positioned upper and lower holes and being numbered in consecutive order, said pairs of holes being arranged along a top edge of said card such that intervals from one pair of said vertically positioned upper and lower holes to the adjacent pair of said vertically positioned upper and lower holes correspond respectively to intervals from one of said colored symbols to the adjacent colored symbol on said colored linear pattern on said back surface, and a plurality of plastic flexible movable tabs being colored the same as the colors of said selectable color-coded answers, being removably inserted into said pairs of holes, and being visible above said top edge of said card, whereby upon completion of a particular problem on said front surface the tab of the color of the selected answer is inserted into a particular pair of holes corresponding to said particular problem so that a correct answer or an incorrect answer is determined by aligning said colored linear pattern on said back surface with a colored linear pattern created by visible parts of the colored tabs on said separate flat answer card.

2. The workbook according to claim 1, wherein said colored linear pattern on said back surface is a band of a number of colored rectangles, corresponding to the number of problems on said front surface, each of colored rectangles representing the color of a correct answer to each of the corresponding problem on said front surface.

3. The workbook according to claim 1, wherein each of said tabs is oblong and has both an upper prong and a lower prong which are suitable for insertion into said vertically positioned upper and lower holes respectively providing fixation thereof.

* * * * *